Dec. 1, 1970  G. CLEMENCEAU  3,543,562
APPARATUS FOR DETECTING FLAT PORTIONS ON WIRES AND RODS
Filed Jan. 7, 1969
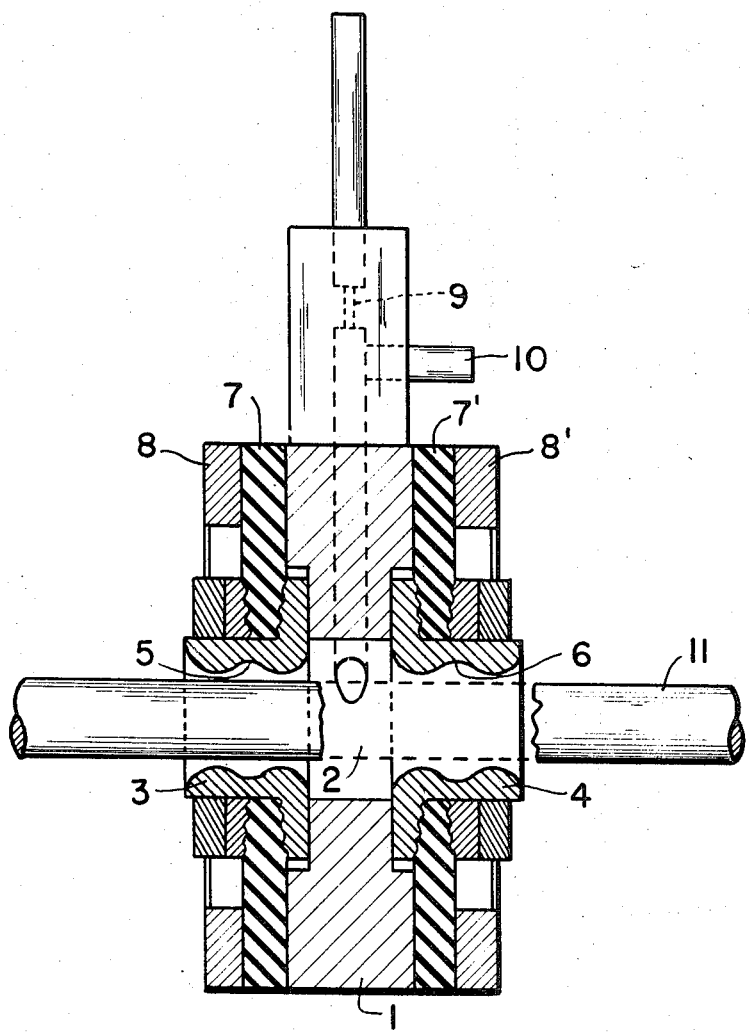
INVENTOR.
Georges Clemenceau
BY Webb, Burden, Robinson & Webb
HIS ATTORNEYS

United States Patent Office

3,543,562
Patented Dec. 1, 1970

3,543,562
APPARATUS FOR DETECTING FLAT PORTIONS ON WIRES AND RODS
Georges Clemenceau, Albertville, France, assignor to Ugine Kuhlmann, Paris, France, a corporation of France
Filed Jan. 7, 1969, Ser. No. 789,485
Claims priority, application France, Sept. 20, 1968, 166,934
Int. Cl. G01b *13/00*
U.S. Cl. 73—37.7    3 Claims

ABSTRACT OF THE DISCLOSURE

Method and apparatus for pneumatically measuring the area and finding defects in the section of elongate materials such as wires and rods. The apparatus comprises a body with a pressure chamber therein which has inlet and exit orifices enabling the elongate materials to be passed continuously therethrough. Compressed air is delivered to the chamber through an orifice at a constant pressure and the chamber is connected to a means for measuring the pressure therein. Aligned with the orifices are guides having internal walls substantially conforming to the section of the elongate materials. The section of the guide means is generally slightly larger than the nominal section of the elongate materials being tested. Placed centrally within the guides are enlarged sections forming a peripheral expansion groove. The pressure within the pressure chamber changes as the section of the elongate materials passing through the guide means changes.

---

Certain industries use steel wire received, for example, on coils or reels or as rods in very long pieces. Wire and rod have manufacturing defects, one type of which is a flat part caused by the removal of a shaving. Defective pieces are preferably eliminated by an apparatus comprising shears controlled by a detecting device. The rod and wire pass continuously through the detecting device and thence through the shears. When a defective portion fo the rod passes through the dectecting device, it signals the shears to remove the defective portion.

Prior art pneumatic detectors comprise nozzles which emitted a gas under constant pressure into a chamber disposed radially around the wire or rod product traveling therethrough. The passage of a flat part on the wire or rod changes the size of the opening space in the chamber in front of at least one of the nozzles, thus causing an increase in the flow of the gas into the chamber. This flow is used as an initial control signal. The signal may be transformed into an electrical signal by means of a suitable transducer.

The chief drawback to these devices lies in the necessity for precise centering of the moving rod or product within the chamber and relative to the openings of the nozzles. Sufficiently precise centering is practically impossible to achieve, especially when the product is a steel wire of varying thickness.

According to this invention, there is provided an improved pneumatic measuring device for detecting local variations in the cross section of wire or rods passing therethrough. The measuring device or apparatus according to this invention comprises a body having internal walls defining a pressure chamber. The chamber has inlet and exit orifices enabling the elongate materials to be passed continuously therethrough. A passageway is provided for delivering compressed air under constant pressure through an orifice or atomizer to the chamber. Another passageway is provided for connecting the chamber to a pressure measuring device. Guide means are aligned with the chamber orifices having internal walls substantially conforming to the section of the elongate materials. The guide means have a section that is generally slightly larger than the nominal section of the elongate materials being measured. Centrally located within the guide means is at least one enlarged section forming a peripheral expansion groove.

When a wire portion that is free from defects passes through the pressure chamber and adjacent guides, the escaping flow of compressed gas is constant and the pressure in the chamber is constant. But when a flat portion of the wire enters a guide, the section or space permitting gas outflow is increased and the pressure in the chamber drops sharply. This change in flow and pressure can be measured and can be used to actuate a control mechanism for shears or other means which will remove the defective section.

It is preferable that the inside diameter of the guide means be 0.02 to 0.25 mm. greater than the nominal diameter of the elongate materials being tested. The expansion grooves are an essential feature of this invention. They enable the pressure within the chamber to be stabilized after a defect in the elongate materials has moved through the guide means. It is preferable that the sections of the expansion grooves be between 3 and 40% of the section of the elongate materials being tested.

According to a preferred embodiment of this invention, each guide is cylindrical and is secured to the walls of the chamber by an airtight but flexible joint. This construction provides certain freedom of pivoting to the guides which reduces their wear and enables the testing of products which are not perfectly straight.

The single figure is a schematic view in section of an apparatus according to the invention and intended to detect flat portions on a steel wire.

Referring now to the drawing showing a preferred embodiment of this invention, the body 1 of the measuring device has cylindrical interior walls defining a pressure chamber 2, while 3 and 4 are the adjacent cylindrical guides situated at the entry and discharge openings for the product which moves therethrough essentially along the axis of the chamber. On the inner surface of the cylindrical guides there are expansion grooves 5 and 6. Each cylindrical guide such as 3 is made of processed steel and is mounted on a synthetic rubber plate such as 7 and 7' secured to the body by a flange such as 8 and 8'. Compressed air at a constant pressure is fed to the chamber by means of calibrated restricted passageway 9. The inlet for detecting pressure is at 10.

The embodiment shown in the drawing is intended to be exemplary only. Hence, it would be possible, for example, to use synthetic rubber joints fitted precisely to the cylindrical guides.

The following table shows the results obtained with an apparatus whose atomizer or orifice has a diameter of 1.8 mm., whose cylindrical guides have a diameter of 12.10 mm., and whose grooves, curvilinear in section, have a width of 4 mm. and a maximum depth of 1.5 mm. The feeding pressure of the air to the atomizer was 2 kg./cm.$^2$. Three sections of wire of closely related diameters were passed through and the pressure in the chamber was measured in each instance.

TABLE I

| Diameter of wire (mm.) | Pressure when a wire without flat portions passes through (kg./cm.$^2$) | Pressure when a flat portion passes through (kg./cm.$^2$) |
|---|---|---|
| 12.04 | 1.8 | 1.2 |
| 12 | 1.2 | 0.7 |
| 11.96 | 0.7 | 0.4 |

The apparatus according to this invention may be used for measuring the area of the section of elongate products that are moving therethrough, and particularly, the diameters of products having a circular section.

This use requires previous calibration of the apparatus, an operation which consists in measuring the pressure in the chamber for a given guide, atomizer, and feeding pressure, as a function of the diameter of a piece passing through. The parameters which enable the greatest precision may be found by similar experimentation.

By way of illustration, the apparatus substantially identical to that shown in the single figure was equipped with cylindrical guides having nominal diameters of 11.6 mm., and three grooves having a circular profile and a depth of 1.2 mm. and width of 4 mm. A 2 mm. orifice for supplying pressurized gas was used. Two series of measurements were conducted with compressed air introduced into the chamber at two bars and three bars, respectively. The measurements were made to determine the diameters of products ranging from 11.30 to 11.50 mm. The following results were obtained.

TABLE II

| Diameter (mm.) | Chamber pressure (feeding pressure 3 bars) | Chamber pressure (feeding pressure 2 bars) |
| --- | --- | --- |
| 11.30 | 1 | 0.71 |
| 11.35 | 1.51 | 1.06 |
| 11.40 | 2.02 | 1.41 |
| 11.45 | 2.53 | 1.76 |
| 11.50 |  | 1.98 |

Table II establishes that the variations in pressure were linear beginning with the total clearance of about 0.15 mm. between the cylindrical guides and the test piece. The sensitivity was 10 mb. per micron in the first case and 7 mb. per micron in the second case. The fact that the clearance between the cylindrical portion or guides and the test piece may reach 200 to 300 microns with no harmful effect on the sensitivity is favorable for the satisfactory operation of the apparatus, since it allows one to avoid the risks of jamming the test pieces into the cylindrical guides. Since the wires pass into the entry guide and then into the discharge guide, and air escapes through each guide from the pressure chamber, the measured diameter is a median diameter. It is, therefore, desirable to reduce the length of the device between the guides as much as possible. Diameter readings can be measured directly on a manometer especially graduated for this purpose. The detected pressure can be also converted and read as electrical magnitudes by a transducer and registering device.

Having thus described my invention in detail and with the particularity required by patent law, what is desired to have protected by Letters Patent is as follows.

I claim:
1. An apparatus for measuring the area and finding defects in the section of elongate materials such as wire and rod, comprising body means having internal walls defining a pressure chamber, said chamber having inlet and exit orifices enabling the elongate materials to be passed continuously therethrough, means for delivering compressed air at constant pressure to said chamber through an orifice, means for connecting said chamber to a pressure measuring device, guide means aligned with said chamber orifices having internal walls substantially conforming to the section of the elongate materials, said guide means having a section generally slightly larger than the nominal section of the elongate materials, and at least one centrally spaced enlarged section forming peripheral expansion grooves, said expansion grooves have a section ranging from 3 to 40% of the section of the elongate materials, whereby the pressure in the pressure chamber changes as the section of the elongate materials passing therethrough changes.

2. The apparatus according to claim 1 in which the guides are connected to the chamber by means of airtight flexible joints which allow them angular displacement from the axis of the chamber.

3. An apparatus according to claim 1 in which the guides are cylindrical and the difference between a nominal diameter of the elongate materials and the smallest diameter of the guides is between 0.02 and 0.25 mm.

References Cited

UNITED STATES PATENTS 2,402,293  6/1946  Nye.
3,232,096  2/1966  Bruijel _____ 73—37.6

LOUIS R. PRINCE, Primary Examiner

W. A. HENRY II, Assistant Examiner